Aug. 6, 1929.  R. STOHRER  1,723,714
CLEANING INTESTINES
Filed Feb. 24, 1925   2 Sheets-Sheet 1

Inventor:
Robert Stohrer
by [signature]
Atty.

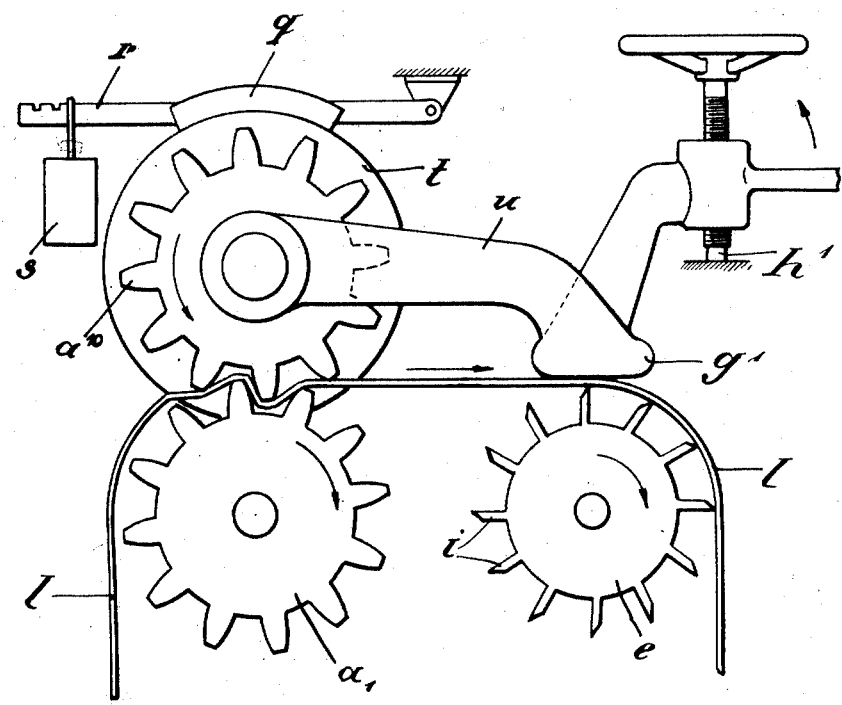

Patented Aug. 6, 1929.

1,723,714

UNITED STATES PATENT OFFICE.

ROBERT STOHRER, OF LEONBERG, GERMANY.

CLEANING INTESTINES.

Application filed February 24, 1925, Serial No. 11,275, and in Germany February 28, 1924.

My invention relates to the cleaning of animals' intestines for use as sausage casings or the like, and more particularly to a novel process and means for effecting such cleaning in less time and more efficiently than was hitherto possible.

The cleaning of intestines is effected by scraping them until the mucous membrane which covers the inner wall has been detached. However, the cleaning by hand with the aid of a spoon-shaped scraper was rendered difficult by the circumstance that the mucous membrane firmly adheres to the fresh intestines of hogs and sheep. As a rule, therefore, these intestines were not subjected to treatment before the mucous membrane had begun rotting and fermenting, whereupon it was stripped off by hand. If mechanical devices were employed for this purpose, they were either designed with a view to imitating as closely as possible the stripping by hand, or else the intestines were first subjected to a preliminary kneading operation and were thereafter treated with yielding scrapers or on a yielding support so as to obtain the soft action of the hand scraper.

In accordance with the present invention, the intestines are subjected to the action of a rigid milling tool cooperating with a non-yielding support, the intestines being allowed to pass through between the tool and the support. The distance between the tool and the support can be varied by well known means, and is preferably adjusted for about double the thickness of wall of the cleaned intestines. The milling cutter is provided with narrow cutting edges having about the sharpness of a blunt knife edge. A feed device cooperates with this tool in such manner that the number of rotations of the tool can be varied in relation to the feed, about as in a metal working machine, and can be regulated in such way that the feed motion intermediate the operation of two consecutive cutting edges does not exceed a few millimeters.

In the drawings affixed to this specification and forming part thereof two devices embodying my invention are illustrated diagrammatically by way of example.

In the drawings

Fig. 1 is a side elevation, partly in vertical section, of the main parts of the device, while

Fig. 3 is a diagrammatic side elevation of a modification.

Figure 1:
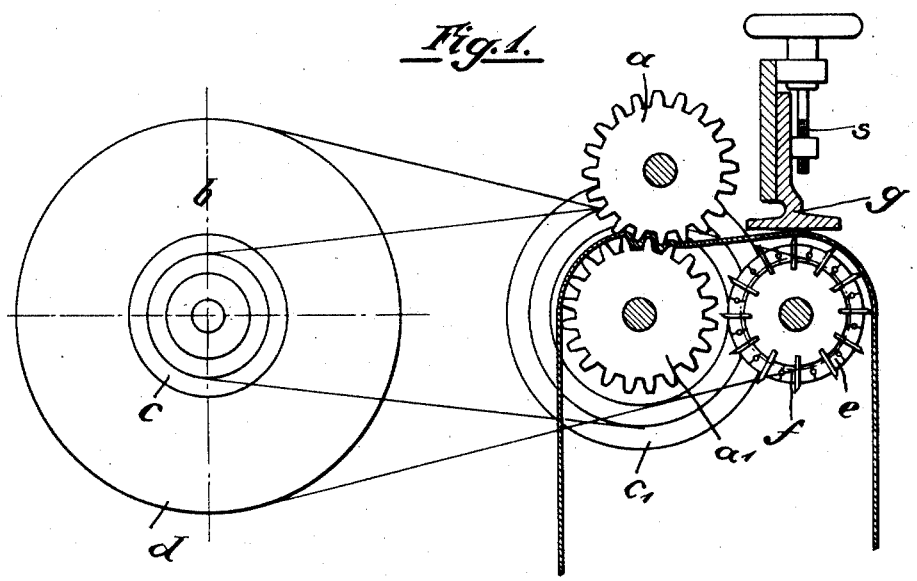
Figure 2:
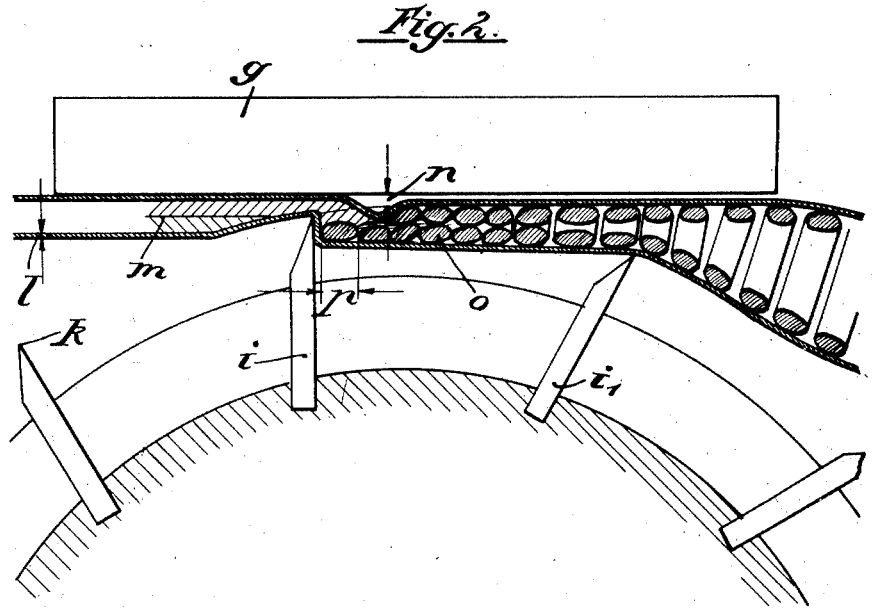
Fig. 2 shows the cooperating portions of the milling cutter and the abutments drawn to a larger scale with the longitudinal section of the intestine passing through between them.

Referring first to Figs. 1 and 2, $a$ and $a^1$ are toothed rolls serving for feeding the intestine. Roll $a^1$ is driven from the intermediate gear $b$ by means of a belt passing over conical sheaves $c$, $c^1$, thus rendering the feeding speed easily variable. The sheave $d$ drives the milling cutter $e$ by means of sheave $f$. The abutment plate $g$ can be adjusted relatively to the cutter by means of a screw spindle $h$. As shown in Fig. 2, the cutters $i$ of the milling tool $e$ have sharp edges $k$ which press against the outer wall $l$ of the intestine and through it against the mucous membrane $m$. The cutters $i$ being so adjusted with regard to the plate $g$ that the distance $n$ equals double the thickness of the wall $l$, these walls can pass through between the tool and plate, while chips $o$ are detached from the mucous membrane, the thickness of which corresponds to the feed motion brought about by the feed rolls $a$, $a^1$. These toothed rolls might as well be replaced by plain rolls or by a conveying belt or the like. The abutment plate $g$, instead of being displaceable, might as well be fixedly mounted, the bearings of the milling tool being arranged for displacement. However, in every case the distance between the cutter and the plate must be constant during the operation, neither one nor the other part being allowed to yield.

In the modification disclosed in Fig. 3 the driven feed roll $a^{10}$ is provided with a regulatable brake device comprising a brake block $q$ mounted on a rock lever $r$, a displaceable weight $s$ pressing the block against a brake disc $t$ integral with roll $a$. This brake device might also be replaced by a spring tending to turn the driven roll in one direction whereby the same faces of the teeth are caused to cooperate regardless of the direction of rotation of the rolls.

The pitch of the two toothed rolls differs from the normal in that the gaps are considerably larger than corresponds to the thickness of the teeth so that in each gap besides the tooth of the other roll also a double layer of non-cleaned intestine can be accommodated. In passing through between the teeth the intestine is thoroughly kneaded, the intensity of this operation being controlled by varying the resistance of the driven roll. The milling tool is similar to that shown in Figs. 1 and 2, but the abutment plate $g^1$, instead of being guided in a line and rigidly held by a spindle $h$, is supported by a lever $u$ carrying the spindle $h^1$ which rests against a fixed point. The total weight of the combined plate $g^1$ and lever $u$ is such that under normal conditions the plate will not yield in upward direction.

Obviously the new process allows treating and finishing the intestines while still warm and fresh from the body of the animal.

I wish it to be understood that I do not desire to be limited to the exact details of construction shown and described, for obvious modifications will occur to a person skilled in the art.

I claim:—

1. Intestine cleaner comprising a nonyielding abutment plate, a rigid rotary milling cutter adapted to cooperate with said plate, both said plate and said cutter being substantially rigidly supported, means for feeding the intestine in the direction of rotation of said cutter and means for varying the distance between said plate and said cutter.

2. Intestine cleaner comprising a nonyielding abutment plate, a rigid rotary milling cutter adapted to cooperate with said plate, both said plate and said cutter being substantially rigidly supported, means for feeding the intestine in the direction of rotation of said cutter and means for adjusting said plate relatively to said cutter.

3. Intestine cleaner comprising a nonyielding abutment plate, a rigid rotary milling cutter adapted to cooperate with said plate, both said plate and said cutter being substantially rigidly supported, a pair of toothed feed rolls arranged for feeding the intestine in the direction of rotation of said cutter and means for varying the distance between said plate and said cutter.

4. Intestine cleaner comprising a nonyielding abutment plate, a rigid rotary milling cutter adapted to cooperate with said plate, both said plate and said cutter being substantially rigidly supported, means for feeding the intestine in the direction of rotation of said cutter and means for varying the distance between said plate and said cutter, said cutter being rotated with greater velocity than the feed of the intestine.

5. Intestine cleaner comprising a nonyielding abutment plate, a rigid rotary milling cutter adapted to cooperate with said plate, both said plate and said cutter being substantially rigidly supported, a pair of toothed feed rolls arranged for feeding the intestine in the direction of rotation of said cutter, the gaps between the teeth of said rolls being considerably longer than the thickness of said teeth, and means for varying the distance between said plate and said cutter.

6. Intestine cleaner comprising a nonyielding abutment plate, a rigid rotary milling cutter adapted to cooperate with said plate, both said plate and said cutter being substantially rigidly supported, a pair of toothed feed rolls arranged for feeding the intestine in the direction of rotation of said cutter, means for braking said rolls and means for varying the distance between said plate and said cutter.

In testimony whereof I affix my signature.

ROBERT STOHRER.